United States Patent [19]
Au

[11] Patent Number: 5,937,400
[45] Date of Patent: Aug. 10, 1999

[54] METHOD TO QUANTIFY ABSTRACTION WITHIN SEMANTIC NETWORKS

[76] Inventor: Lawrence Au, 5904 N. 5th St., Arlington, Va. 22203-1010

[21] Appl. No.: 08/825,552

[22] Filed: Mar. 19, 1997

[51] Int. Cl.⁶ ............................. G06F 15/18; G06F 17/20
[52] U.S. Cl. ................................................................ 706/55
[58] Field of Search ................................... 706/10, 55, 50

[56] References Cited

U.S. PATENT DOCUMENTS

| | | | |
|---|---|---|---|
| 4,868,733 | 9/1989 | Fujisawa et al. | 706/55 |
| 4,914,590 | 4/1990 | Loafman et al. | 704/8 |
| 5,056,021 | 10/1991 | Ausborn | 704/9 |
| 5,111,398 | 5/1992 | Nunberg et al. | 704/9 |
| 5,598,560 | 1/1997 | Benson | 395/707 |
| 5,625,814 | 4/1997 | Luciw | 707/5 |
| 5,644,740 | 7/1997 | Kiuchi | 345/357 |
| 5,664,181 | 9/1997 | Velissaropoulos et al. | 707/102 |
| 5,694,590 | 12/1997 | Thuraisingham et al. | 707/9 |
| 5,721,895 | 2/1998 | Velissaropoulos et al. | 707/104 |
| 5,742,284 | 4/1998 | Duggan et al. | 345/335 |

OTHER PUBLICATIONS

Pinker, Steven, *The Language Instinct*, ©1984, pp. 218–230.
Kolodner, Janet, *Retrieval and Organizational Strategies in Conceptual Memory*, ©1984, pp. 32–43, pp. 102–109.
Kolodner, Janet, *Cased Based Reasoning*, ©1993, pp. 346–349, pp. 662–663.

*Primary Examiner*—Robert W. Downs

[57] ABSTRACT

A computer implemented conversational method to parse meaning from input sequences of symbols, using a large dictionary stored in a semantic network, where thousands of dictionary entries for symbols are stored as nodes connected by inheritance links. Input symbols are matched to dictionary entries, with priority given to entries which cover a range of concreteness similar to the range covered by the dictionary. Ranges of concreteness which are missing are identified and reported back to the user. Concreteness of each entry is quantified from topology of inheritance links; quantification is done automatically when defining meanings by inheritance. As network topology shifts due to creation and removal inheritance links, quantified concreteness of affected dictionary entries are updated, automatically maintaining a consistent concreteness numbers. New inheritor links cause entries to become more concrete. When they become too concrete to be inherited from, indirect links via entries of lesser concreteness are substituted for the direct links, thus maintaining a uniform and consistent inheritance topology within the semantic network. Variations in dictionary semantics emerging between authors or evolving over time are automatically cohered into a single consistent inheritance topology, by shifting the inheritance links so that concrete entries always inherit from more abstract entries. When parsing text, the accuracy of the method of Most Specific Common Abstraction is improved by the consistency and uniformity of inheritance enforced by the shifting of inheritance links to conform to a consistent topology of inheritance.

9 Claims, 10 Drawing Sheets

METHOD TO QUANTIFY ABSTRACTION WITHIN SEMANTIC NETWORKS

BACKGROUND OF THE INVENTION

The present invention relates to computer systems storing natural language concepts and a dictionary or database of meanings associated with symbols useful for storing natural language concepts. Most dictionaries serve people who are looking up loosely defined meanings or spellings for specific words. A few dictionaries serve computational linguists, in order to automatically identify grammatical structures within simple sentences. Although grammatical structure conveys some meaning within sentences, the full meaning of sentences extends to deeper levels than grammar. To help identify those deeper meanings, computational linguists devise systems to store meanings in ways which differentiate abstract general meanings from concrete specific meanings (see Steven Pinker, The Language Instinct ©1984, page 219).

The ability to differentiate abstract from concrete meaning confers significant advantages when parsing and interpreting conversational dialog. In sentences, references to pronouns and implied objects can be resolved by linking them to structures of deeper meaning. Within the flow of conversation, abstract meanings are associated with implied objects in a manner affected by the changing context of the conversation. For overall conversations, links to abstract meanings complement links to concrete meanings. A conversation linking only abstract meanings is overly vague. A conversation linking only concrete meanings omits links to the organizing essences and presumptions which are a crucial part of deeper meanings. The following conversation (from Steven Pinker, The Language Instinct ©1984, page 227) shows the significance of deeper meaning in normal conversation:

Woman: I'm leaving you.

Man: Who is he?

A grammatical structure without links to deeper meaning about human behaviors would not comprehend the situation described by the above conversation. On the other hand, conversations linking only to deeper meaning also can be incomplete. The following conversation shows how a conversation weakens when deprived of concrete information:

Son: How come you have more money than I do?

Father: Son, you have to buy low and sell high.

Son: How did you know what to buy?

Father: Early to bed and early to rise makes a man healthy, wealthy and wise.

Without linking the aphorisms to specific concrete actions, the father's responses are hollow and incomplete. A system for differentiating between abstract and concrete meaning can provide a basis for identifying the hollowness of the father's responses. The following conversation has a more balanced range of abstraction:

Tourist: How do I get to the train station? Is it hard to get to?

Commuter: No, it's always easy this time of day. You can take the 40A bus, in about ten minutes.

Tourist: Where do I get it?

Commuter: Right here at this bus stop.

The concept of 'hard to get to' and 'always easy' above are general abstract concepts, and the concepts of 'the 40A bus' and 'ten minutes' are concrete specific concepts linked to the general concepts by a mid-level concept 'at this bus stop'. Thus the above conversation conveys a range of abstraction which has a quality of completeness and continuity. A system for quantifying the difference between abstract and concrete meaning would also provide a basis for quantifying the qualities of completeness and continuity in all three of the above conversations, by tracking the range of abstraction to which each conversation links.

In a system which must parse and interpret conversational dialog, the need to quantify the difference between abstract and concrete meaning frequently arises, and yet that need is typically unfulfilled. The spreading use of computers has caused this deficiency to be commonplace, particularly in the standard graphical user interfaces between humans and computers.

Most current human-to-computer conversational interfaces contain primarily concrete meaning. As a result, such conversations are dominated by literal commands issued from the human and dominated by statements of literal facts issued from the computer. When such conversations run into snags, the snags remain until the human connects the utility of a specific literal command to some abstract general need unrecognized by the computer.

If these conversational interfaces freely utilized and accurately tracked varying levels of abstract general needs, humans could issue commands at various levels of abstraction, and the computer would be able to link those commands into a context of coherent semantic abstraction hierarchies, displaying the linked hierarchy to resolve any ambiguities. Such an interface would be far more robust than current systems when reporting and handling unexpected errors, since errors would be linked to precise points within semantic abstraction hierarchies, rather than being presented within ambiguous contexts such as beeping pop-up dialog boxes or chronological message logs.

Computer-to-computer interfaces also have deficiencies typical of conversations based upon overly literal meaning. The interfaces between computer hardware are mostly based upon protocols of literal meaning, and interfaces between computer software are mostly based on application program interfaces of almost purely literal meaning. The difficulty and necessity of hand-coding error-handlers and protocols for computer-to-computer interfaces has created enormous systems integration problems. Systems integration programming teams typically arrive at solutions by diagnosing faults in, and remapping the causal links between literal commands and general systems integration goals. By linking each command to a precise point within semantic abstraction hierarchies headed by general systems integration goals, the work of systems integration programming teams could be clarified and automated.

In prior art, abstract meanings have been manually defined for parsing deeper meaning from text. Early case-based reasoning systems such as CYRUS (see Janet Kolodner, Retrieval and Organizational Strategies in Conceptual Memory ©1984 on page 34), have used a limited number of manually defined abstract verbs such as PTRANS. PTRANS stands for an abstract verb of motion which requires an actor, an object, a source and a destination. PTRANS is a template of reusable meaning for the broad range of events. Events such as shipping a package overnight, walking from a bathroom to a bedroom and returning books to the library all can inherit meaning from PTRANS.

In CYRUS, these manually defined abstract events provide a means to recognize the similarity between events. For instance, shipping, walking, and returning events can all be linked to a common definition of PTRANS, thus creating an index tree headed by PTRANS. Whenever an event must be recalled involving an actor, an object, a source and a destination, CYRUS can narrow the search to events connected with PTRANS, thus speeding up the search. CYRUS also conserves memory by using links to PTRANS which take up less memory than storing the PTRANS template in each inheriting event such as shipping, walking or returning.

CYRUS also creates new generalizations by comparing features of incoming events to the features of previous events. If the same features repeatedly appear in incoming events, CYRUS then creates a new generalization event containing the common features, and replaces those common features inside other events with links to the generalization event.

After creating such generalization events, CYRUS then tracks their certainty, since CYRUS may have overgeneralized. CYRUS tracks this certainty by comparing the number of events which successfully utilize the generalization to the number of events which would conflict with the generalization by having some but not all its features. When conflicts appear frequently, CYRUS computes a lowered certainty for the generalization-concept. When a generalization-concept falls below a certainty threshold, it is removed, causing CYRUS to re-map connections away from the failed generalization-concept.

Although CYRUS remembers generalization failures as notable events, and afterwards avoids such generalizations, CYRUS has no methods to utilize generalization failures as evidence of abstract conceptual activity. CYRUS's methods dealing with failure are thus consistent with assumptions that all current art shares: that failure is to be avoided, that certainty makes information more useful and that uncertainty makes information less useful.

These assumptions guide current systems builders to treat uncertain information like unrefined mineral ore. Current art attempts to refine large quantities of uncertain information into small quantities of certain information, resulting in large quantities of rejected information which are information "tailings" regarded as useless by the refinement process. However, in the present invention, by recycling concepts associated with failure, useful information about the abstract structure of concepts can be acquired.

In current art there are many systems which rely upon manually defined abstraction hierarchies for parsing meaning from text. Parsing usages of such hierarchies were described by Janet Kolodner in Retrieval and Organizational Strategies in Conceptual Memory ©1984 on pages 346–349. Parsing systems have been developed which combine definitions of abstraction hierarchies with definitions of augmented transition networks, for example, U.S. Pat. No. 4,914,590 granted Apr. 3, 1990 to Loatman et al. Systems also have been developed utilizing specific formats for storing abstraction hierarchies, for example, U.S. Pat. No. 4,868,733 granted Sep. 19, 1989 Fujisawa et al. By carefully constructing user interfaces to describe existing abstraction hierarchies, these systems help people to edit the existing abstraction hierarchies.

Some systems use abstraction hierarchies to compute the degree of similarity between concepts (see Janet Koloder, Case-Based Reasoning ©1993, page 346), by using 'specificity values' assigned to each node of abstraction hierarchies, seeking a 'most specific common abstraction' between two symbols. In such systems, highly abstract concepts have less specific numbers assigned, and highly concrete concepts have more specific numbers assigned, the 'specificity values' being a span of numbers such as fractions (0.2, 0.5, 0.7, etc.) ranging from zero to one in size.

However, there are no means in prior art to automatically assign 'specificity values' to symbolic nodes using as input only the changes in topology of links within a semantic network, as does the present invention. By automatically assigning 'specificity values' to symbolic nodes, the consistency of 'specificity values' can be maintained automatically, preventing errors of human judgment which creep into large manually defined linguistic structures.

The extreme complexity of linguistic structures (most commercially useful natural language dictionaries have over 100,000 entries) prevents any one person from defining the whole linguistic structure. When multiple people define a large linguistic structure, slight inconsistencies in their viewpoints for interpreting the linguistic structure cause dramatic exponential increases in the population of inconsistencies within the linguistic structure.

The present invention deals with these inconsistencies by using symptoms of inconsistencies to re-assess 'specificity values' and properly restructure semantic abstraction hierarchies based on the latest assessment of 'specificity values'.

SUMMARY OF THE INVENTION

The present invention considers generalization failures to be empirical evidence of abstract conceptual activity, activities whose symptoms include adaptation and retraction of links. Abstract general ideas are linked to belief systems, hypotheses, trend projections and other inherently difficult presumptions. As a result, links to abstract general ideas are frequently adapted and retracted. Concrete ideas, on the other hand, are linked to cleanly focused well specified activities where causality is nearly constant. As a result, links to concrete ideas can be implemented reliably on a massive scale with very few retractions.

The present invention considers linking failures to reveal that the concepts affected by linking failures participated in implementation of adaptation, hence those concepts have become abstract. At the same time, the present invention considers linking successes to reveal that in the concepts affected by linking success, associated causalities have become nearly constant, hence those concepts have become concrete.

If a link to a concept is attempted just twice, and it fails once and succeeds once, that doesn't show much evidence of retraction or non-retraction. If later the same concept gets one hundred new links and ninety of those links fail, it shows that the concept required a great deal of adaptation to reach its current semantic position in the semantic network, thus the meaning of the concept is empirically abstract.

If even later on, 1000 new links to the same concept are attempted and all 1000 links succeed, with no failures, this shows that the meaning of the concept is now so refined that adaptation is no longer necessary to its implementation, hence the meaning of the concept has been become something concrete, something which can be plugged in and used directly.

Over time, extraordinarily abstract concepts can be identified by this approach. For example, abstract concepts such as beauty and understanding defy any attempts to fully remove the adaptations needed when implementing them. Over time, the need for adaptations when implementing beauty and understanding have remained. In the present invention, the inherently abstract nature of such concepts would be quantified by the large number of retracted links to such concepts.

The current invention quantifies the relative abstraction of concepts by tracking the number of added links and the number of retracted links to each concept. Overall, the current invention empirically maps each concept to a specific point on an abstract-to-concrete range of numbers.

The current invention stores concepts in semantic hierarchies where the most abstract concepts in each hierarchy are positioned at the top of the hierarchy, the next most abstract concepts are positioned just below the top, and the least abstract concepts in each hierarchy positioned at the bottom of the hierarchy. This is a standard arrangement used in hand-built semantic networks. What is new in the current invention is that abstraction for each concept is being recalculated on the fly from empirical evidence and there is an opportunity to automatically reassign concepts to appropriate positions in the hierarchy, immediately, without manual intervention, to immediately reap the benefits of a corrected semantic tree, which include greater consistency and accuracy when retrieving information. In the case of semantic hierarchies which describe procedural methods, a corrected semantic tree's functional decomposition is more accurate and it's causal hierarchy is easier to follow.

In the current invention, the methods for quantifying abstraction and reorganizing abstraction hierarchies are employed as frequently as possible, to cause small incremental reversible changes to the semantic network, thus mitigating the danger of sudden change which exists in self-organizing systems. The small incremental changes to the semantic network include means to reposition concepts which have just become more abstract to neighboring locations in the semantic network befitting their newly abstract character. At the same time, the present invention repositions concepts which have just become more concrete to neighboring locations in the semantic network befitting their newly concrete character.

The methods of the present invention migrate concepts to appropriate positions within the semantic network, regardless of their original meaning. Shifts in meaning over time are handled automatically, causing shifts in semantic position without final limitation. Over time, the methods of the current invention may cause any concept to become very abstract, or very concrete depending upon its empirically determined abstraction number. Consequently, even if the system is initialized with a small set of hand-coded concepts, with some abstract and some concrete, over time the meaning of those concepts could shift, causing the positions of those concepts to migrate toward the opposite end of the abstract-to-concrete numeric scale from where they began when the system was initialized. By allowing unlimited migration, any mistakes within the system can be corrected.

In a very simple example of the current invention, changes to dictionary entries are made by creating and removing links to dictionary entry symbols. The dictionary entry symbols are just sequences of bytes containing spelled out words or phrases, possibly concatenated with a unique identifier for differentiating between words having the same spelling but different sense of meaning. In this simple example of the current invention, dictionary entries are added by linking a new symbol to the existing main network of links, and dictionary entries are deleted by removing its last link to the main network of links. For this simple example of the current invention, operations to re-write the sequence of bytes spelling out the words or phrases would result in a new symbol linked in to replace the old symbol.

In this simple example of the current invention, the smallest increment of change would be the creation or retraction of an individual link. For each of the dictionary entries, a count of the number of added links and a count of the number of retracted links would be kept. During the life span of the dictionary entry, these numbers would either stay constant or rise. The quantified concreteness for any dictionary entry could be calculated by any numeric function using both the counts of created ("C") and retracted ("R") links, where said numeric function returns a higher concreteness number when C is increased, and said numeric function returns a lower concreteness number when R is increased. Examples of such functions include R divided by C, R minus C, R-squared divided by C, etc. The proper choice of this function would depend upon detailed implementation goals of the system, such as whether to map to a range of fractional numbers from zero to 1 (similar to probability numbers) or whether to map to a set of numbers including all real numbers, positive and negative. Other implementation goals affecting the choice of function would be the desired relative weighting of significance of creating vs. retracting links, and the setting of initial values for C and R when a new dictionary entry is being added to a specific point in the hierarchy before significant empirical evidence has been gathered.

The quantified concreteness would be very small for very abstract concepts, and very large for very concrete concepts. Hereinafter, the term 'concreteness number' is used interchangeably with the term 'abstraction number' to mean the same kind of number on an abstract-to-concrete numeric scale.

DETAILED DESCRIPTION OF THE INVENTION

Prior art has shown that simple semantic networks ordered into hierarchies where inherited nodes are more abstract than inheritor nodes can function as useful lookup indices when searching for existing instances of concepts. For example, in FIG. 1 a small semantic network is shown organized by concreteness numbers denoted in parentheses, so that each entry is required to inherit only from the more abstract entries having smaller concreteness numbers. The dictionary entries for 'aquatic', 'animal', 'viviparous', 'ear lobes' and 'ropelike' all have concreteness (100). Each is the most abstract dictionary entry in its own hierarchy. A most abstract entry in a hierarchy is hereinafter referred to as a peak abstraction. Underneath the peak abstraction of 'animal', the dictionary entry for 'mammal' has concreteness (110), showing that 'mammal' is more concrete than 'animal', and that 'mammal' is positioned to require attributes of 'animal'.

When searching for instances of an animal, if we know that the instance sought has a characteristics unique to a mammal, such as viviparous birth, (as opposed to being hatched from eggs), the search can be contained within the intersection of 'viviparous' and 'animal' hierarchies, in the subtree of 'mammal' dictionary entries, to make the search more efficient.

Incoming information often drives the creation and retraction of links, causing adaptation and repositioning of dictionary entries in their semantic hierarchies.

Figure 1:
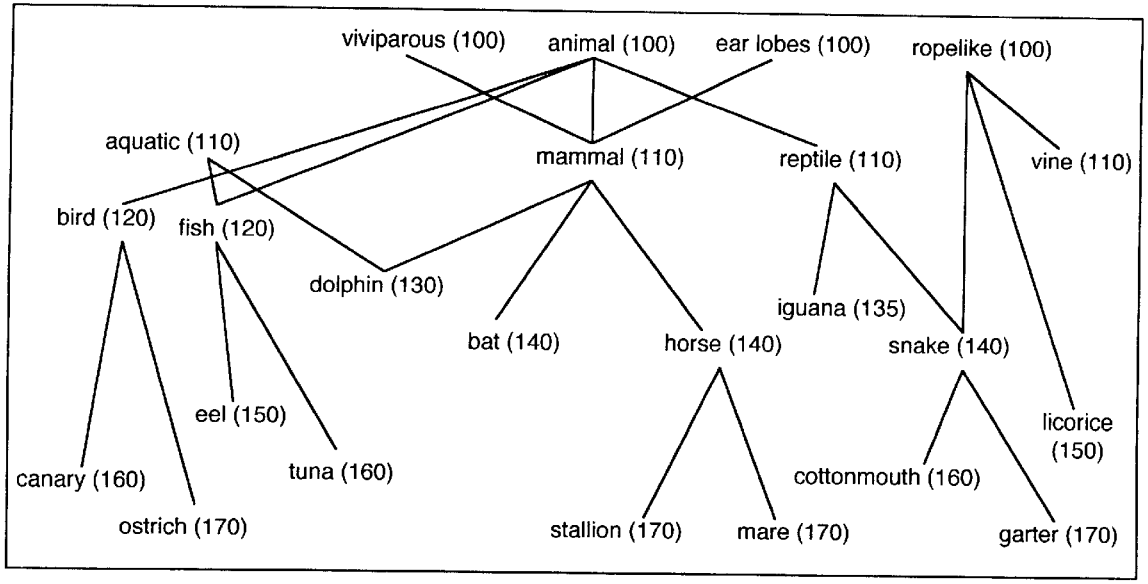
FIG. 1 is an example of a semantic network composed of abstraction hierarchies for the concepts 'aquatic', 'viviparous', 'animal', 'ear lobes', and 'ropelike'.
Figure 2:
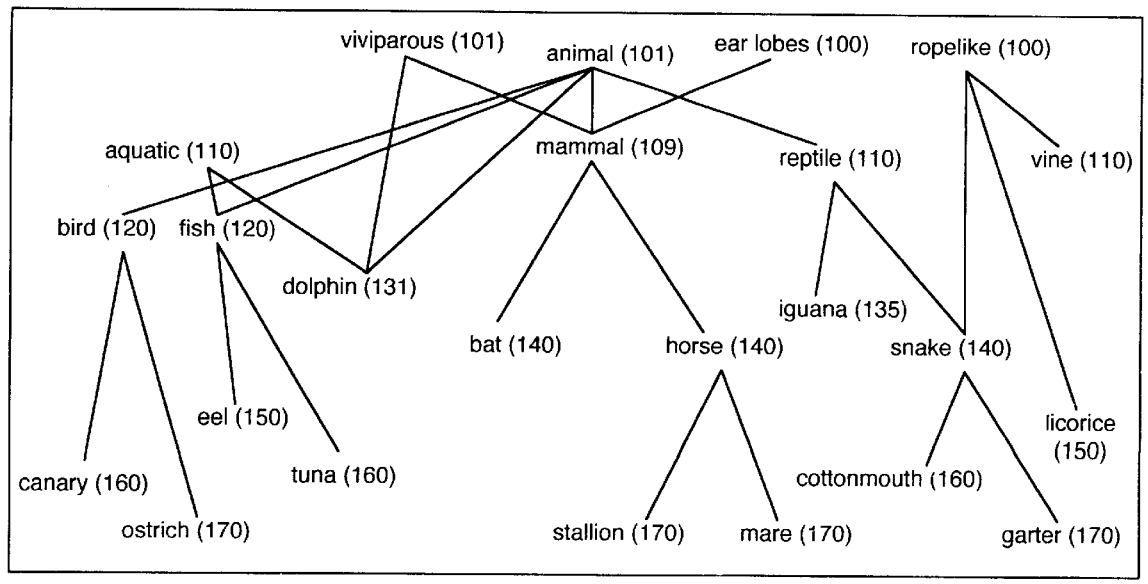
FIG. 2 is a similar semantic network in which the meaning of 'dolphin' has shifted from inheriting from 'mammal' to inheriting directly from 'viviparous' and 'animal'.

For example, in FIG. 2, after observing that a dolphin has no ear lobes, the dictionary entry 'dolphin' might be unlinked from 'mammal', since in FIG. 1 all mammals inherit from 'ear lobes (100)'. In this example, the function which assigns concreteness numbers to each node is 'C minus R' where C is for each node the number of links created directly to node and R is for each node the number of links retracted directly from that node.

The function 'C minus R' would reduce the concreteness number for 'mammal' to 109 (shown) and 'dolphin' to 129 (not shown). Immediately after, 'dolphin could be linked to 'animal'. This would increase the concreteness number for 'animal' to 101 (shown) and 'dolphin' to 130 (not shown). To re-establish the notion that dolphins are viviparous, a new direct link from 'dolphin' to 'viviparous' would be formed. This would increase the concreteness number for 'viviparous' to 101 (shown) and 'dolphin' to 131 (shown).

If many more links to 'animal' were created, its concreteness would rise further, possibly becoming more concrete than 'mammal', 'reptile', 'bird' and 'fish'. This would violate the constraint that inherited nodes must be more abstract than their inheritors.

Figure 3:
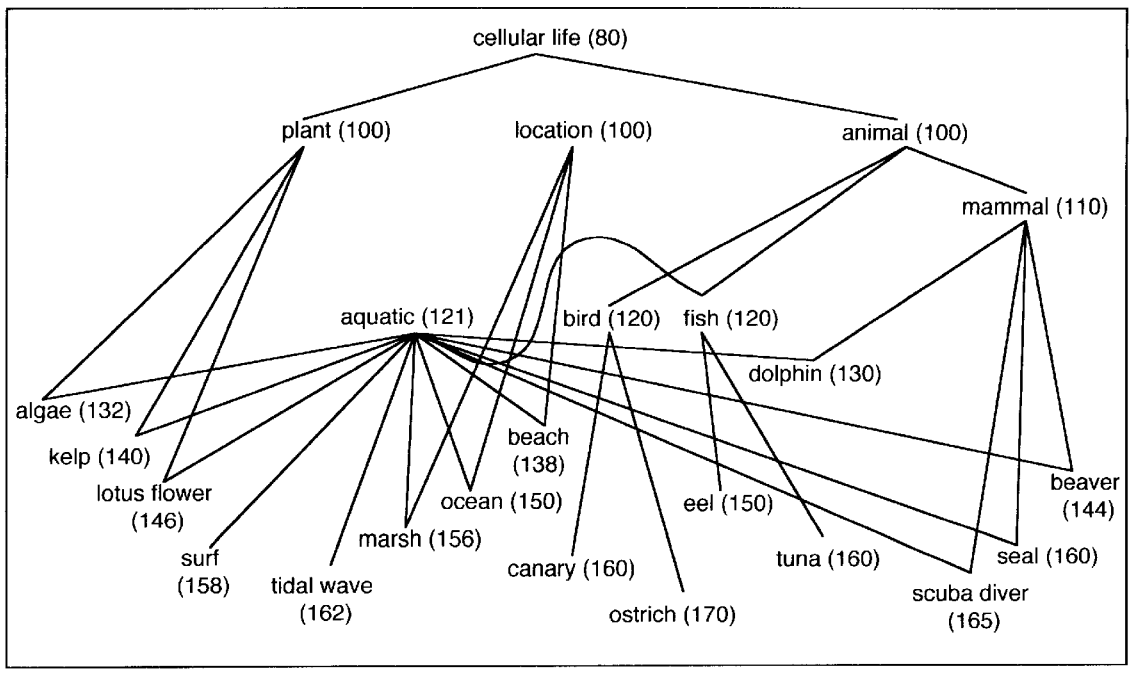
FIG. 3 is a semantic network, similar to a portion of FIG. 1, showing how the addition of many more links to the concept of 'aquatic' would shift the meaning of that concept towards greater concreteness, making 'fish' unable to properly inherit from 'aquatic'.

An abstraction, such as 'animal' (101) could be pulled down to such a concrete level that some of its inheritors could no longer inherit from it. In FIG. 3, a modified portion of the abstraction hierarchy of FIG. 1 is shown, where the peak abstraction 'aquatic (121)' has acquired eleven new inheritors. Again using a concreteness function of 'C minus R', its concreteness has increased from 110 in FIG. 1. to 121 in FIG. 3. This makes its link to the inheritor 'fish (120)' untenable, thus an immediate adjustment of the semantic network must be made.

Figure 4:
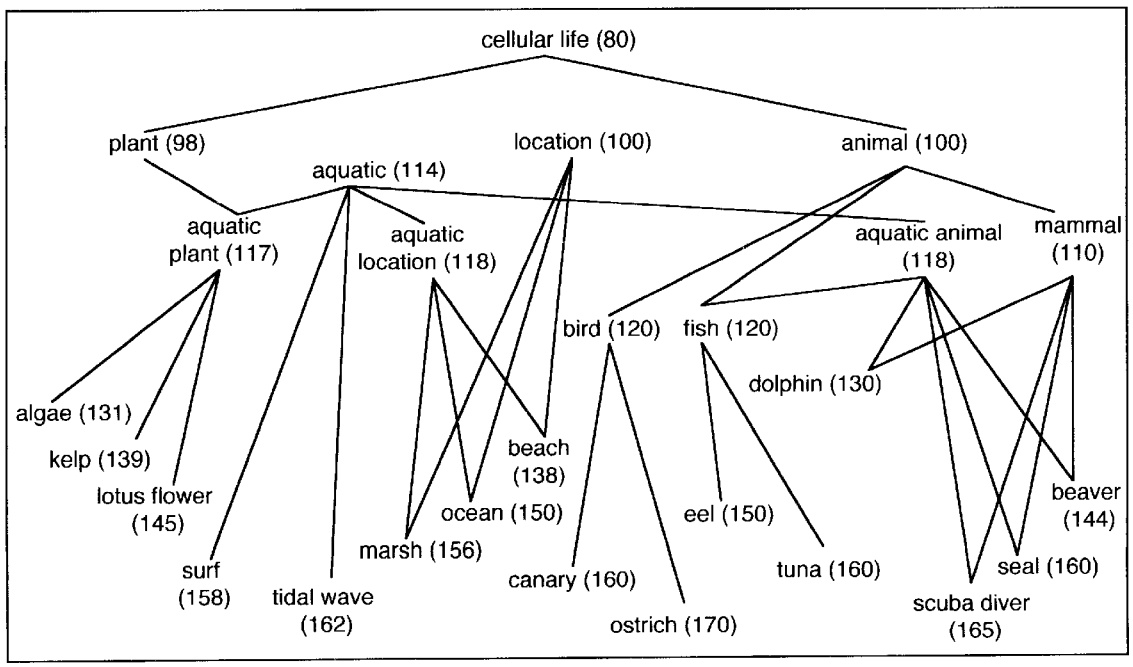
FIG. 4 is a semantic network, similar to FIG. 3, showing how the creation of intermediary entries between 'aquatic' and its inheritors enables the concept of aquatic to shift toward greater abstractness, allowing 'fish' to again inherit from 'aquatic'.

FIG. 4 shows adjustments made, by the methods of the present invention, to restore 'aquatic' to a concreteness number less than 'fish', and to reduce the concentration of links around 'aquatic' which reduce the efficiency of search around the concept of 'aquatic'. New intermediary entries are created to make these adjustments. Most of the direct links between 'aquatic' and its inheritors are replaced by links via new intermediaries of 'aquatic plant (117)', 'aquatic location (118)' and 'aquatic animal (118)'. This replaces eleven inheritor links to 'aquatic' with three new intermediary inheritor links, a net loss of seven links, thus reducing the concreteness of 'aquatic' from 121 to 114. In this way, 'aquatic' again becomes more abstract than 'fish', so that 'fish' can inherit from 'aquatic', but this time through an intermediary.

The initial concreteness numbers of 'aquatic plant (117)', 'aquatic location (118)' and 'aquatic animal (118)' are created to be part-way between aquatic and its inheritors. The specific algorithm which calculates their part-way concreteness numbers is an implementation detail which can be done in many ways, so long as the result is of greater concreteness than the general concept (such as 'aquatic') and yet of less concreteness than any of its inheritors (such as 'algae', 'kelp', 'marsh', 'ocean', 'bird', and 'fish').

The grouping of 'algae', 'kelp' and 'lotus flower' under the new entry 'aquatic plant' is natural and easy to arrange since 'algae', 'kelp', and 'lotus flower' were already grouped under the peak abstraction 'plant'. Similarly, the grouping of 'marsh', 'ocean' and 'beach' were already grouped under the peak abstraction 'location'. The methods of the present invention can easily group them and any inheritors of 'aquatic' which belong to other peak abstractions into appropriate intermediary groups, even automatically naming these new intermediary groups by concatenating 'aquatic' with the names of the other peak abstractions to create new entry names of 'aquatic plant', 'aquatic location' and 'aquatic animal'.

Some inheritors may not have alternate peak abstractions. For instance, in FIG. 4, 'surf (158)' and 'tidal wave (162)' have only 'aquatic' as their peak abstraction. As shown in FIG. 3 and FIG. 4, there is no information linked to these concepts to automatically suggest a new second peak abstraction for them, and so the methods of the present invention would include asking for more information about 'surf (158)' and 'tidal wave (162)' in a way that might relate them under some general concept. The methods of the present invention might include composing questions such as: 'what do surf and tidal wave have in common besides being aquatic?'. If the answer were 'movement', then this could become the peak abstraction which allows them to be grouped together under a new intermediary of 'aquatic movement' (not shown).

Alternatively, contents of symbols 'surf' and 'tidal wave' might be automatically analyzed, possibly parsing and matching on imbedded sub-sequences such as 'tidal', 'wave' and 'surf' which may be imbedded in other symbols of the semantic network. This type of intra-symbol matching may be slow and resource-intensive, but still useful in automatically suggesting a shared new second abstraction for 'surf (158)' and 'tidal wave (162)'.

In FIG. 4, in the grouping of 'aquatic plant', all the direct links between 'algae', 'kelp' and 'lotus flower' were replaced by the indirect links through 'aquatic plant', thus reducing the concreteness of 'plant' from 100 to 98, and reducing the concreteness of 'algae', 'kelp' and 'lotus flower' by one each. As long as the resulting shifts in concreteness do not interfere with any existing inheritance links, the methods of the present invention can automatically simplify the semantic network in this way, by recognizing which inheritance links have become redundant and removing redundant links. (This is not shown in FIG. 4 for 'aquatic location' and 'aquatic animal' concepts.)

In this way, a semantic network can expand in a manner that keeps the abstraction hierarchies from branching too much at any one node, so that the meaning of each node is described succinctly by a small number of branches. Keeping the number of branches from any entry to a reasonable number also helps when using distance (number of links) when determining the degree to which ideas are related (see Janet Kolodner's Case-Based Reasoning ©1993, page 347).

The methods of the present invention also make adjustments when an initially concrete entry loses many of its links, thus becoming more abstract, sometimes too abstract to inherit from some of the inherited nodes it is linked to. This type of situation occurs when a concept becomes less well understood than originally conceived, or becomes independent of the general context it originally was attached to.

Examples of this adjustment happen when concrete concepts prove to have significance in another context. For instance, when the 3M Company had a project to develop a super-strong adhesive, the project discovered a very weak adhesive, so weak that the slightest tug would undo its bond. This very weak adhesive was at first considered a concrete example of a failed experiment. Later however, someone at 3M realized that the very weak adhesive would be perfect for a different purpose, and used it to create Post-it notes (a registered trade mark of 3M), which developed into a major new portion of 3M's business.

Figure 5:
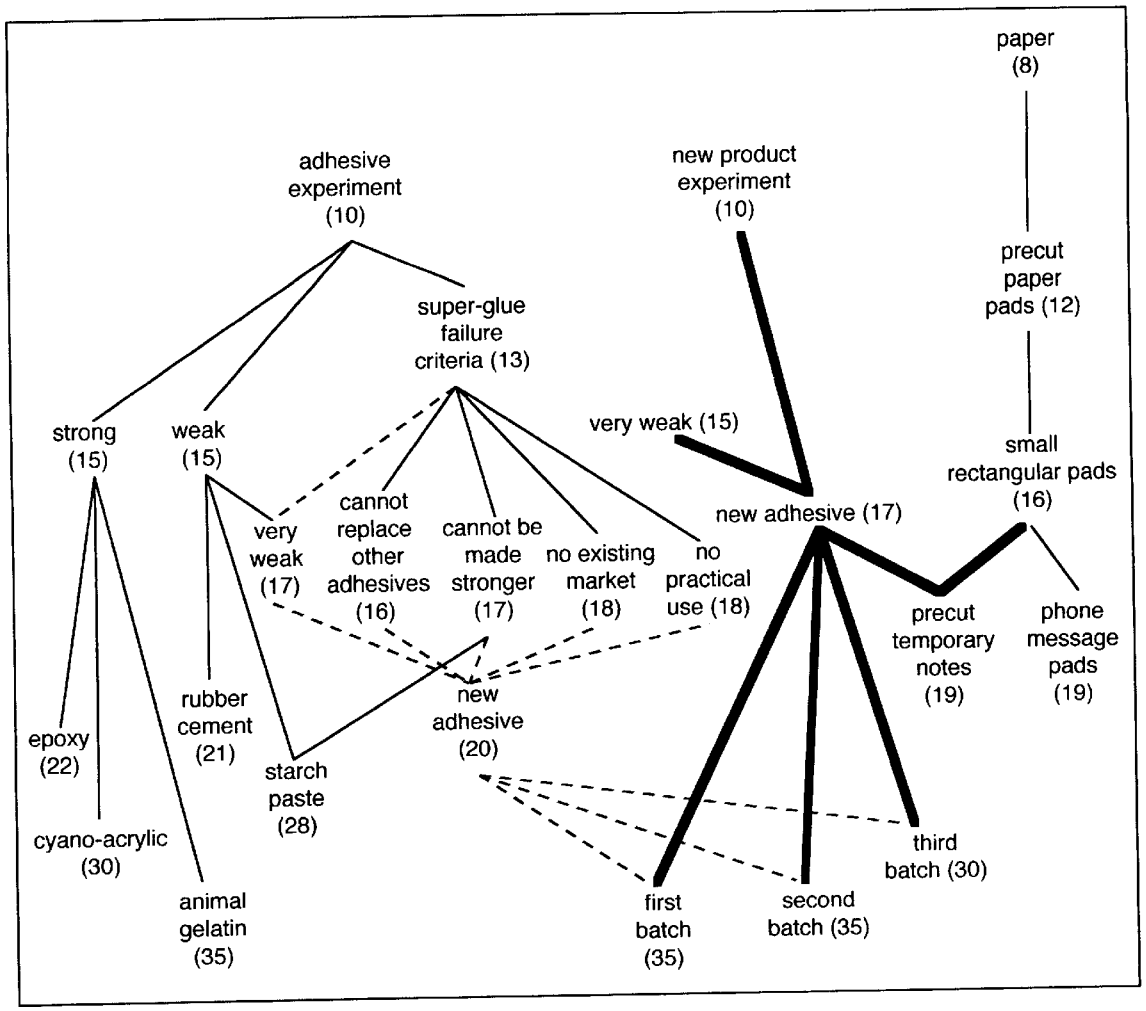
FIG. 5 is a semantic network, composed of abstraction hierarchies for 'adhesive experiment' and 'new product experiment', giving an example of how retraction of dashed-line links to the concept 'new adhesive' repositions the meaning of that concept (shown in the bold line links) at greater abstractness.

In FIG. 5, this type of adjustment is illustrated, using dashed lines to indicate pre-adjustment links, using bold lines to indicate post-adjustment links and using solid normal thickness lines to indicate links unchanged by the adjustment. The dictionary entry for 'very weak (17)' initially appears as a concrete entry under 'super-glue failure criteria (13)' under 'adhesive experiment (10)'. After recognizing the abstract advantage of a very weak adhesive, 'very weak' is disconnected from the 'adhesive experiment' hierarchy, losing two links and becoming more abstract with a concreteness number of 15.

As part of the adjustment, the dictionary entry for 'new adhesive (20)' is also disconnected from the 'adhesive experiment' hierarchy, losing four links and becoming more abstract with a concreteness number of 16 (not shown). Still inheriting from 'very weak (15)' it forms a new hierarchy also inheriting from 'new product experiment (10)'. The entry 'very weak (15)' is now an abstract peak of its own. The movement abstractward of 'very weak' and 'new adhesive' puts them in a better position to relate to a pre-existing hierarchy of paper products, so that a new paper product entry of 'precut temporary notes (19)' can easily inherit from 'new adhesive(17)'. If 'new adhesive' had not shifted abstractward, the new entry 'precut temporary notes' would have been created as more concrete, rather than where it belongs at the same level of concreteness as 'phone message pads (19)'.

In the present invention, there an important improvement to concreteness functions such as 'C minus R'. This improvement supports the linking of new inheritor entries under generalization entries, even though the new inheritor entries are not yet attached to sufficiently many direct links for functions such as 'C minus R' to assign them concreteness numbers greater than their inherited generalization entries.

It is possible to simply initialize C in the new entries to a positive value 'G' greater than the concreteness of the generalization entries, to make the new inheritor entry appear more concrete than its inherited entry. This type of initialization enables the new entry to inherit from the inherited entry without violating the constraint that inheritor be more concrete than its inherited entry. The disadvantage of this type of initialization is that since R cannot be greater than the number of direct links created to the entry after initialization, functions such as 'C minus R' cannot return a number less than G for the life of the entry, even if the link between the new entry and its inherited generalization entry is later retracted.

Since the positive value G has meaning only in the context of the link between a new entry and its inherited generalization entry, the contribution of the inherited entry's concreteness to the concreteness of the new entry should be removed if the link is removed. To accomplish this, G needs to be stored separately from C, and added to 'C minus R' when computing an entry's concreteness. In the present invention, the inherited generalization entry initially inherited from a new inheritor entry is hereinafter referred to as a 'tether node' of the inheritor node. The difference in concreteness between the new inheritor node and its tether node is hereinafter referred to as the length of the tether link, or the 'tether length' also abbreviated as 'L'.

If an inheritor entry has only one link, and that link is to its inherited tether node, it would be advantageous to adjust the concreteness of the inheritor entry when the concreteness of tether node changes. This reflects that fact that an inheritor entry with only one link is semantically defined almost entirely in terms of that link.

However, if an inheritor entry has more than one link, the other links cannot be to tether nodes; the affect of changes in concreteness of its tether node should be diluted by the semantic significance of its direct links to other nodes. Therefore, in the present invention, the changes in concreteness caused via a tether link from inherited to inheritor entry are mitigated by the number of links to the inheritor node, so that with more direct links to the inheritor node there is less effect on the concreteness of the inheritor node when the concreteness of the tether node changes.

There are many ways of implementing a mitigation of the changes in concreteness of inheritor nodes which are caused by changes in concreteness of their tether nodes. One particularly simple way is to divide the change in concreteness of the tether node 'T' by the number of direct links to the inheritor node 'N'. Thus the more direct links to the inheritor node exist, the less the changes in concreteness of the tether node 'T' change L the concreteness of the inheritor node. The function for calculating the change in concreteness of the inheritor node ('ΔL') may be expressed as the change in inherited node concreteness 'ΔT divided by N.'

The methods of this invention include other useful variations on this function, such as 'ΔT divided by N-squared', which more quickly reduces the effect of ΔT as N increases, and the function (ΔT divided by N) rounded to the nearest integer, so that concreteness numbers can be represented by integers instead of real or rational numbers, thus saving storage space and reducing the number of inheritor nodes which might have to be re-assigned concreteness numbers when their tether nodes concreteness changes, by restricting changes to nodes to those nodes which change in concreteness by at least a full integer step in magnitude.

The amount of tether length L influences the allocated distance in concreteness between inherited and new inheritor nodes. This in turn affects how many new inheritor nodes can be added to a inherited node before its concreteness increases to the point where intermediary inheritors replace direct inheritors, as in between FIG. 3 and FIG. 4. Thus longer amounts of tether length L result in a larger possible number of inheritors directly attached to an inherited node before intermediary inheritors replace direct inheritors, reducing the number of inheritors directly attached to the inherited node.

In this manner, the amount of tether length L influences the average number of ways a node will branch within the semantic network. Depending upon design goals, the amount L may be set to a larger or smaller number depending on what appears to be an optimal balance between search efficiency (less branches) and reduction in the frequency of reorganization (more branches). Other design goals may influence the designed amount of tether length. In FIG. 4 the new nodes 'aquatic plant', 'aquatic location' and 'aquatic animal' each must have assigned concreteness part way between their inherited nodes and their inheritor nodes. The tether lengths assigned to them must result in assigned concreteness part way between their inherited nodes and their inheritor nodes.

In the case of new nodes which must be inserted between inherited nodes and inheritor nodes, the tether length L must be adjusted so that the concreteness of the new node is to be part way between the new node's tether node (concreteness value 'T') and the least concrete inheritor of the new node (concreteness value 'I'). A variety of functions could be employed to do this. For instance, a simple function ((T minus I) divided by 2) could return a tether length L placing the new node halfway between the new node's tether node concreteness value T and the least concrete inheritor of the new node of concreteness value I.

The methods of the present invention may employ other functions for calculating the tether length for new nodes inserted between inherited and inheritor nodes. New nodes inserted with a large number N of direct links to nodes may be between situated with a concreteness number closer than halfway to the least concrete inheritor's concreteness I, to be consistent with other nodes which have accumulated a large number of direct links and thus gained concreteness, putting them closer in concreteness to their inheritors.

For this purpose, ((T minus I) minus ((T minus I) divided by N)) would be a better function for calculating the tether length L. Other functions might be chosen, depending on function chosen for the basic calculator of concreteness. If instead of 'C minus R' a function such as 'C minus R-squared' were the basic calculator of concreteness, the corresponding tether length calculator should be other than ((T minus I) minus ((T minus I) divided by N)).

Figure 6:
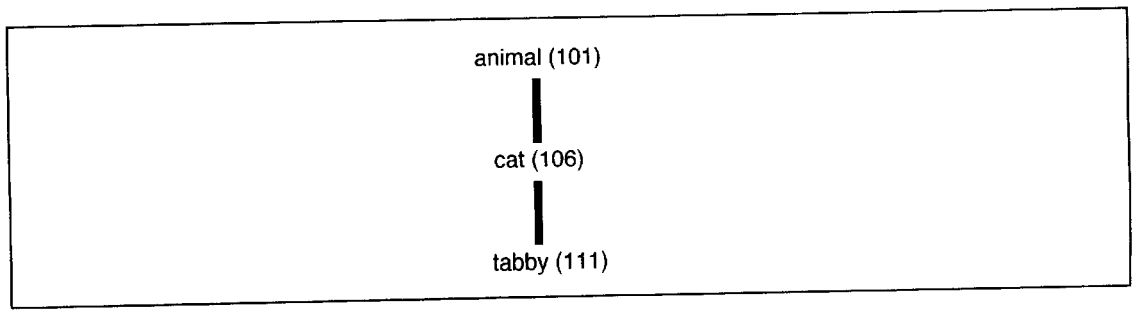
FIG. 6 is a small semantic network, composed of a single abstraction hierarchy with only three nodes linked by two tether links (shown in bold).

In FIG. 6 through FIG. 12, there are demonstrations of the effect of changes in concreteness in tethering nodes on their inheritor nodes. FIG. 6 shows a small semantic net abstraction hierarchy of three levels. This hierarchy might have been created with an initial node 'animal (100)' to which was linked the inheritor 'cat (105)' with a tether length L of 5. Since the number of links to 'animal' has increased by one, using the function 'C minus R' to recalculate the concreteness of 'animal' returns a concreteness of 101. Linking the inheritor 'tabby' to 'cat' with a tether length of 5 sets the concreteness of 'tabby' to 111 and increases the concreteness of 'cat' to 106. Since both the links in FIG. 6 involve inheritor links and their tether nodes, the links are shown by bold lines.

Figure 7:
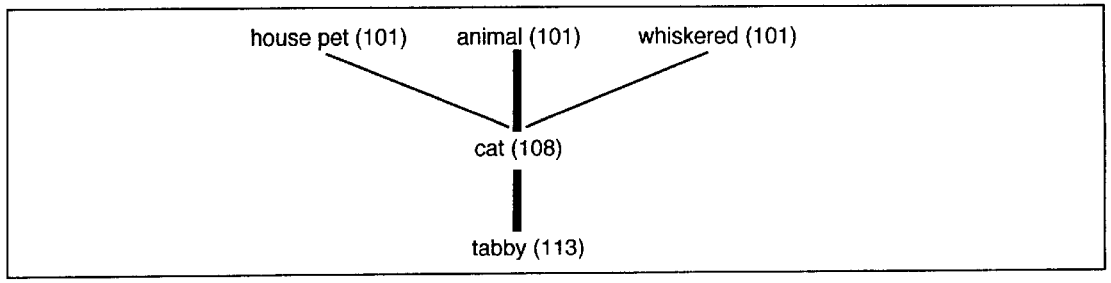
FIG. 7 is the semantic network of FIG. 6, after the addition of two inherited nodes 'house pet' and 'whiskered' which are not linked by tether links (shown in normal weight lines).

In FIG. 7 the semantic net of FIG. 6 is shown, with the addition of two new links to inherited nodes 'house pet (101)' and 'whiskered (101)' for the inheritor 'cat'. These non-tether links are shown by normal weight lines. Since the number of links to 'cat' has increased by two, the concreteness of 'cat' increases to 108. Since 'cat' is a tether node for 'tabby', which has N=1 direct links, the tether length function 'ΔT divided by N' returns 2 for ΔT of 2, changing the concreteness of 'tabby' from 111 to 113.

Figure 8:
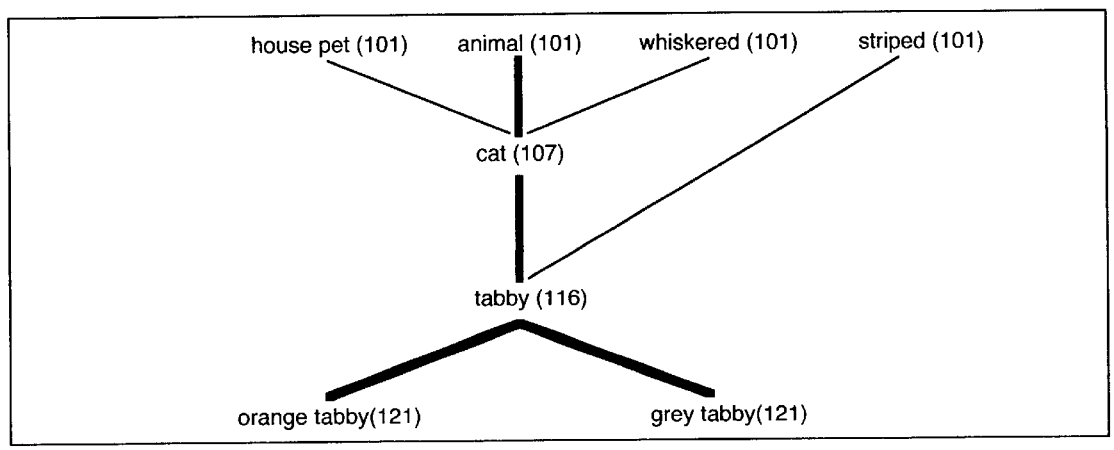
FIG. 8 is the semantic network of FIG. 7, after the addition of three links to 'tabby': one link to the inherited node 'striped' (shown by a normal weight line) and two tether links to the inheritors 'orange tabby' and 'gray tabby' (shown in bold).

In FIG. 8 the semantic net of FIG. 7 is shown, with the addition of three nodes directly linked to 'tabby': 'striped (101)', 'orange tabby (120)' and 'gray tabby (120)'. Since 'tabby' is a tether node for 'orange tabby' and 'gray tabby', the length from 'tabby' to those nodes are shown in bold. Since tabby has acquired three more links, its concreteness increases from 113 to 116. The tether length of 5 for new nodes 'orange tabby' and 'gray tabby' sets their concreteness to 121.

Figure 9:
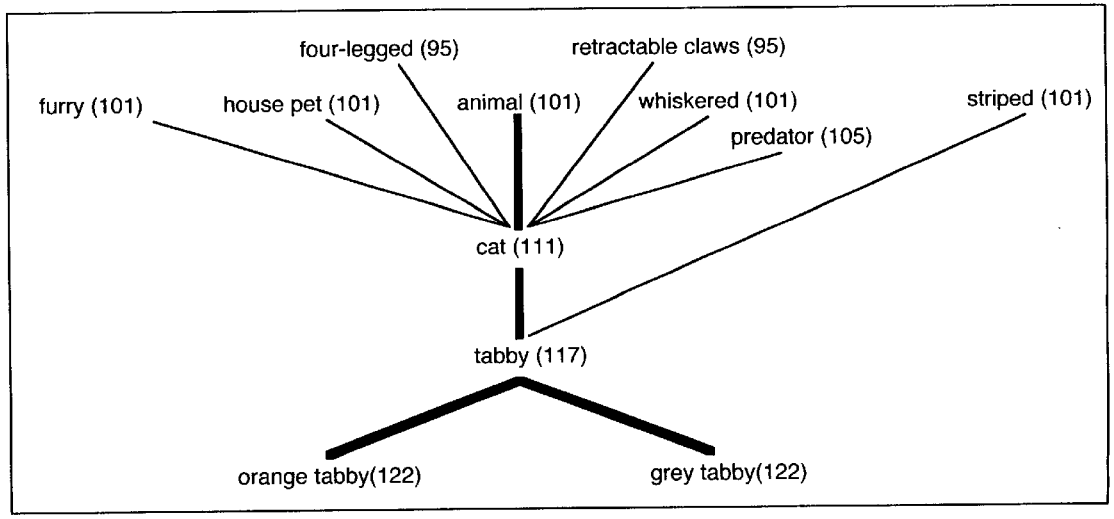
FIG. 9 is the semantic network of FIG. 8, after the addition of four links to 'cat' to inherited nodes of 'furry', 'four-legged', 'retractable claws', and 'predator'.

In FIG. 9 the semantic net of FIG. 8 is shown, with the addition of four nodes directly linked to 'cat': 'furry (101)', 'four-legged (95)', 'retractable claws (95)' and 'predator (105)'. Since the number of links to 'animal' has increased by four, using the function 'C minus R' to recalculate the concreteness of 'cat' returns a concreteness of 111, up from 107 in FIG. 8. Since 'cat' is still a tether node for 'tabby', which now has N=4 direct links, the tether length function 'ΔT divided by N' returns 1 for ΔT of 4, changing the concreteness of 'tabby' from 116 to 117. Note that this change in concreteness for 'tabby' is a much smaller fraction of the change in concreteness for 'cat' which occurred in FIG. 7 when 'tabby' had only 1 direct link instead of 4.

Since 'tabby' is a tether node for 'orange tabby' and 'gray tabby', the change in concreteness for 'tabby' of 1 causes a change in concreteness for 'orange tabby' and 'gray tabby'. Since N=1 for both 'orange tabby' and 'gray tabby', using the tether length function 'ΔT divided by N' returns 1 for ΔT of 1, changing the concreteness of 'orange tabby' and 'gray tabby' from 121 to 122 for each.

Figure 10:
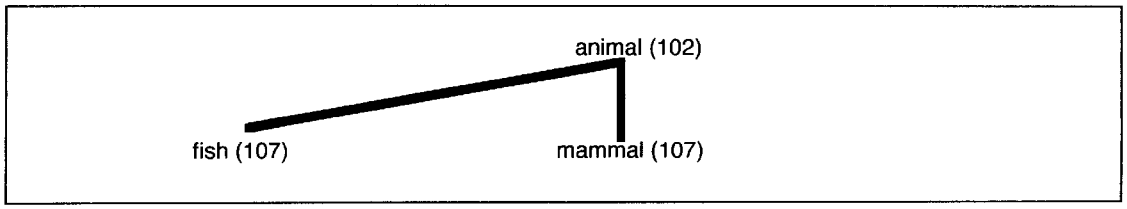
FIG. 10 is a small semantic network, composed of a single abstraction hierarchy with only three nodes linked by two tether links (shown in bold).
Figure 11:
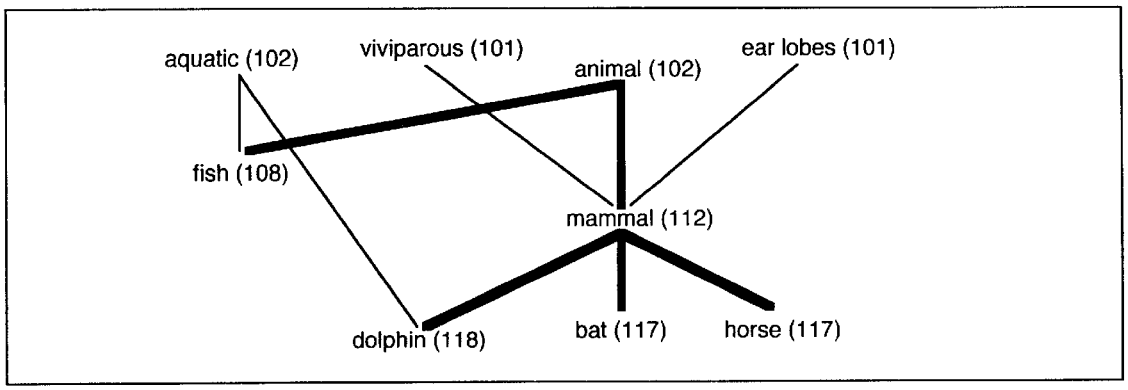
FIG. 11 is the semantic network of FIG. 10, after the addition of eight nodes similar to nodes in FIG. 1: 'aquatic', 'viviparous', 'ear lobes', 'fish', 'dolphin', 'bat' and 'horse'.
Figure 12:
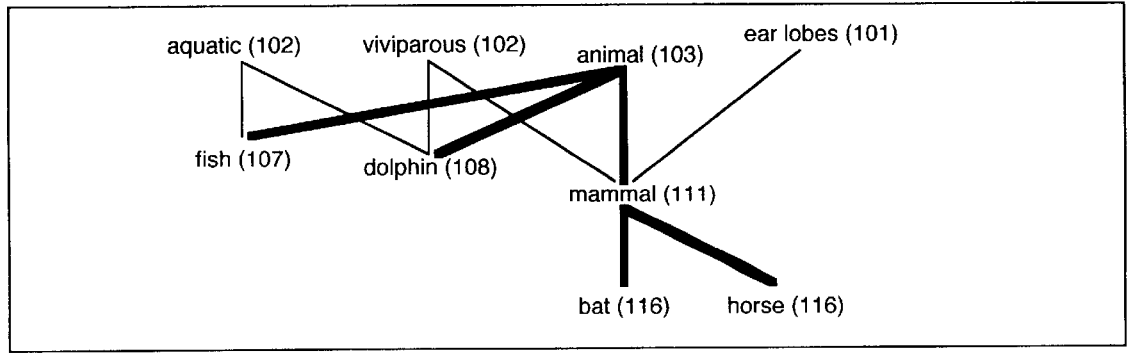
FIG. 12 is the semantic network of FIG. 11, after retraction of the link between 'dolphin' and inherited node 'mammal' and the direct linking of 'dolphin' to inherited nodes 'viviparous' and 'animal'.

In FIG. 10 through FIG. 12, the effect of unlinking a tether node is shown. In FIG. 10, a small semantic net abstraction hierarchy is shown, in which the node 'animal (102)' has two inheritors 'fish (107)' and 'mammal (107)'. Since 'animal' is a tether node for both 'fish' and 'mammal', the links from 'animal' to 'fish' and 'mammal' are shown in bold.

In FIG. 11, the semantic net of FIG. 10 is shown, with the addition of six nodes similar to nodes from FIG. 1: 'aquatic (102)', 'viviparous (101)', 'ear lobes (101)', 'dolphin (118)', 'bat(117)' and 'horse (117)'.

Since 'mammal' has acquired five more direct links, its concreteness has increased from 107 to 112. Two inheritors of 'mammal' have been added with tether lengths of 5 at concreteness 117: 'bat' and 'horse'. Dolphin, the third inheritor of 'mammal' was added with a tether length of 5 but it also has a direct link to aquatic (102) which increased the concreteness of 'dolphin' to 118.

Since fish has acquired an additional link to 'aquatic', its concreteness has increased to 108 from 107.

In FIG. 12, the semantic net of FIG. 11 is shown, with the unlinking of 'dolphin' from 'mammal' to reflect the observation that dolphins do not have ear lobes. The link between 'dolphin' and 'mammal' is therefore replaced with two new links, one to allow 'dolphin' to inherit from 'animal' and one to allow 'dolphin' to inherit from 'viviparous'. Since viviparous and animal have therefore acquired one more link each, they are assigned increased concreteness, viviparous from 101 to 102 and animal from 102 to 103.

Since 'mammal' was the tether node for 'dolphin' and the link from 'dolphin' to 'mammal' was retracted, a new tether node for 'dolphin' needs to be established. The logical choice is the most concrete node from which 'dolphin' now inherits, 'animal (103)', since this is the inherited node which now limits the concreteness of 'dolphin' to being greater than 103. By making 'animal' the new tether node for 'dolphin', 'dolphin' (not having any inheritor nodes) is assigned a tether length of 5, resulting in a new concreteness number for dolphin at 108.

Since 'mammal' has one less direct link, its concreteness drops to 111 from 112. For 'bat' and 'horse', 'mammal' is still a tether node, so the change in concreteness for 'bat' and 'horse' exactly equals the change in concreteness in 'mammal' since 'bat' and 'horse' each have only one direct link. Therefore, the concreteness of 'bat' and 'horse' each goes from 117 down to 116.

The complete set of methods for assigning a concreteness number within the present invention permits concreteness numbers to vary in response to any changes in semantic nets, effectively creating an elastic quality to such nets, whereby the creation and retraction of links within the net cause gradual shifts in semantic meaning.

The present invention includes other adjustments dealing with initially concrete entries that lose so many links that they become too abstract to inherit from their remaining directly inherited generalization nodes. At this point, links to their directly inherited generalization nodes could be automatically replaced with links to the inherited generalization nodes of their inherited nodes, hereinafter referred to as their 'grandparent nodes'. If such an entry had no grandparent nodes, it would become a new peak abstraction of its own and any of its inheritors could be linked automatically to inherit from its generalization inheritor nodes (the inheritors' grandparent nodes).

It is possible to have a version of the invention where the addition and retraction of links only affects the abstraction number of the abstract entry side of the link, or only affects the abstraction number of the concrete entry side of the link. These versions tend to be more complex since there is inheritance meaning on both of inheritance links; ignoring that meaning on one side while computing abstraction numbers tends to require extra abstraction number adjustment mechanisms later on, or extra mechanisms to track the significance of links on the other side.

By requiring inheritance links to be ordered by concreteness numbers, where inheritors always have higher concreteness than their parents, the resulting inheritance hierarchies can be characterized on a universal scale, allowing them to be more useful when bridging between separate abstraction hierarchies. The idea of a universal scale of abstractions is discussed in prior art (see Janet Kolodner's Case-Based Reasoning ©1993 on page 346). There the term 'specificity values' is used to describe universal concreteness numbers assigned to each node in a abstraction hierarchies. A universal scale of abstraction has many uses, such as computing the semantic distance between ideas (also described in Janet Kolodner's Case-Based Reasoning ©1993 on page 347), and performing efficient matching between two ideas, a task often referred to as bridging between hierarchies.

Figure 13:
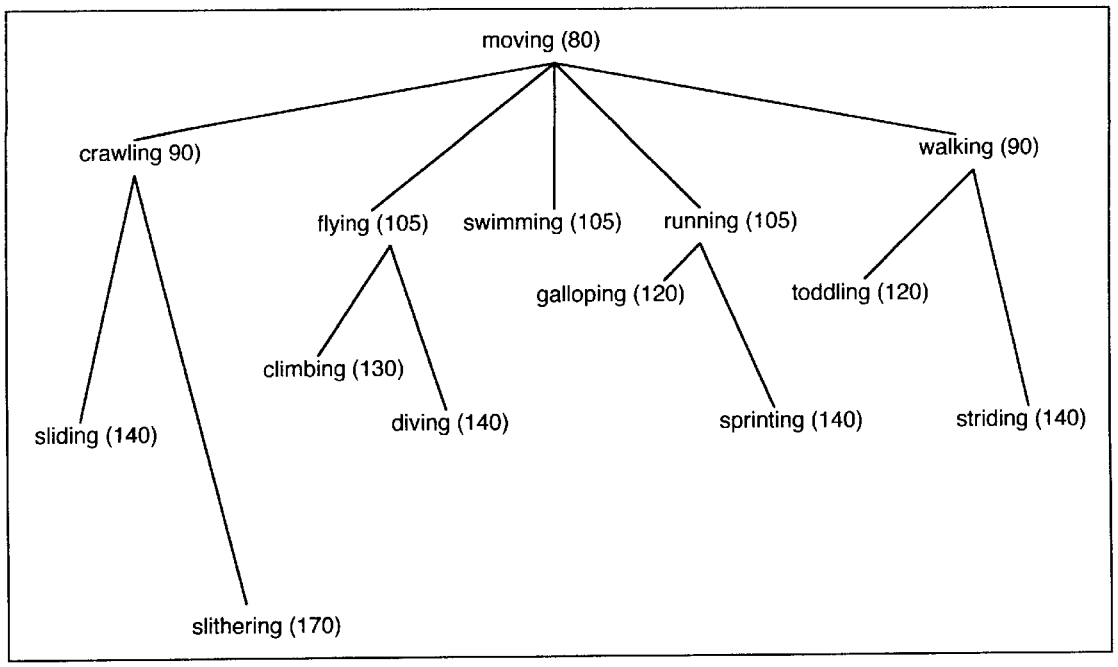
FIG. 13 is a semantic network composed of an abstraction hierarchy for the concept 'moving'.
Figure 14:
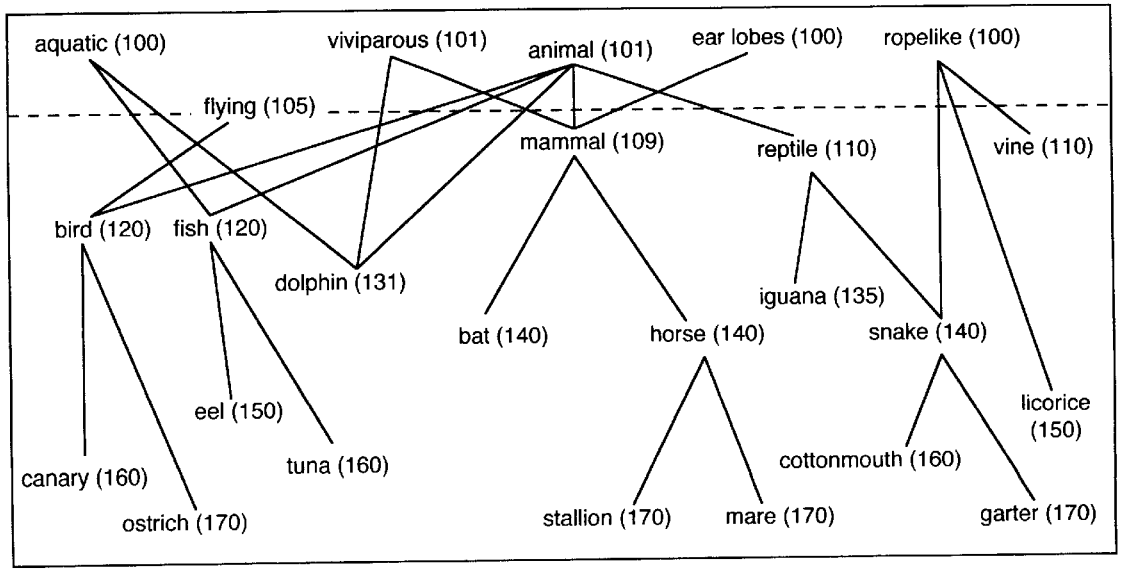
FIG. 14 is a semantic network composed of the abstraction hierarchies in FIG. 2 with a link to the concept of 'flying' from FIG. 6.

For example, in FIG. 13, an abstraction hierarchy separate from FIG. 2 is shown. FIG. 13's only peak abstraction is moving (80), under which various kinds of moving are detailed. A bridge between the FIG. 2 'animal' hierarchy of FIG. 2 and the 'moving' hierarchy FIG. 13' would be needed, for instance, if we began with the concept of 'flying' and wished to succinctly categorize which animals could fly. This summary categorization is shown in FIG. 14. The concept 'flying (105)' is moderately abstract, so the 'animal' hierarchy links would be searched from 'animal (101)' down to links that cross the moderately abstract level of 105 (horizontal dashed line) that includes 'bird (120)', 'fish (120)', dolphin '(131)', 'mammal (109)' and 'reptile (110)'. The method of searching for a moderately abstract concept to fit a similarly abstract situation is typical of common-sense reasoning, which is useful when bridging must be performed quickly and efficiently. As shown in FIG. 14, 'flying' would be associated with 'bird' but not 'fish', 'dolphin', 'mammal' or 'reptile'.

Common-sense reasoning fails for exceptional cases exist such as birds which do not fly, such as 'ostrich (170)'. It also fails for mammals that do fly, such as 'bat (140)'. If links were created to 'ostrich' based on its inheritance from 'bird', and 'flying' were important to these links, the links would fail, causing 'ostrich' to be recategorized directly under 'animal (101)'. Similarly, 'bat (140)' would be recategorized directly under 'animal', so that it too would be correct in a common-sense search for flying animals.

In the current invention, links based on efficient common-sense searches will cause link failures on exceptional concepts, so that they are automatically repositioned, to ensure better results from future common-sense searches.

In summarizing 'slithering (170)' from FIG. 13 for the FIG. 14 hierarchy of 'animal (101)', the concreteness of 'slithering' would force a common-sense search all the way down to the bottom of the 'animal' hierarchy, searching every concept in that hierarchy. Slithering is a specific type of movement, involving pushing on the ground with the belly. The capacity to slither depends on many structural details such as the length of the spine and width of the belly. Generally, the longer the spine compared with the width of the belly, the more easily an animal can slither. An animal shaped like a rope (long, slender and flexible) can more easily slither.

When relating actual conversation to vocabulary stored in an abstraction hierarchy, there may be a reference to 'animal (101)' and 'slithering (170)'. Since slithering is so concrete, under common-sense searching the whole 'animal' hierarchy shown in FIG. 14 would be searched. But if the conversation also referred to 'ropelike (100)', common-sense searching could utilize the fact that 'ropelike' is a smaller hierarchy to search than 'animal', so it would be an advantage to search the 'ropelike' intersection of 'animal' rather than then whole 'animal' hierarchy. Thus the intersection of 'animal' and 'ropelike' hierarchies at 'snake (140)' would be a more efficient starting point to search concreteward for a good match to 'slithering'.

In Janet Kolodner's CYRUS (in Retrieval and Organizational Strategies in Conceptual Memory ©1984, pages 34–43), the use of indices begins with a choice of a particular set of contexts which in turn determine which of many redundant indices are contextually appropriate to search. Having a universal abstraction number associated with each dictionary entry helps support uniform application of common-sense search techniques as described above, so that the choice of redundant indices is simpler and more efficient. By also keeping the number of links radiating from each entry to a reasonable number, the system can avoid linking entries that are too different in the same abstract level. This automates the creation of good indexing entries.

As described by Janet Kolodner (in Retrieval and Organizational Strategies in Conceptual Memory ©1984, on page 39) concepts that are quite different demand general information to tie them together coherently. In the present invention, candidates for new general concepts emerge when concrete ideas lose links and are subsequently assigned lower concreteness numbers, so that they become abstract general concepts. As described by Janet Koldner (in Retrieval and Organizational Strategies in Conceptual Memory ©1984, on page 39) concepts that are quite alike require general information to make distinctions between them. In the present invention, these distinctions emerge when intermediary concepts replace links to overburdened abstract concepts.

Another property of good indices is the completeness of the vocabulary covered by the indices. Many systems include vocabulary for classifying specific causal relationships, but have left basic causal functionality out of the indexing vocabulary. This often occurs since the programming languages used to implement most systems already support such causal functionality, so implementers avoid reimplementing dataflow, logical and arithmetic functions in the indexing vocabulary simply because they can already hand-code them. However, the hand-coded procedural definitions cannot be searched by the same mechanisms that search the semantic network, unless the hand-coded procedural definitions are represented in the semantic network in a manner consistent with all other entries in the semantic network.

It is an objective of this invention to provide basic operators of data flow, logic, arithmetic, parsing, concatenation, timing, linking, unlinking and operator definition functions, to store procedural definitions primarily by storing links between such basic operators, thus providing means to search procedural definitions by traversing abstraction hierarchy trees of operators. Procedural knowledge is often an important part of knowledge representation. For example, the organizing concept of a script (as described by Janet Koloder in Retrieval and Organizational Strategies in Conceptual Memory ©1984, on page 37) is essentially a kind of procedural knowledge.

By uniformly defining all knowledge within a single semantic network, the system is able to search for features of procedural definitions without resorting to a secondary mechanism to search computer language source code, a laborious and inefficient process which inevitably misses some of the meaning the programmer originally intended when writing the source code. It is better to store procedural knowledge within a semantic network where the intention of low level code can be explicitly linked to higher level semantic abstractions, which are more rigorous and practical to search than comments in computer language code.

Figure 15:
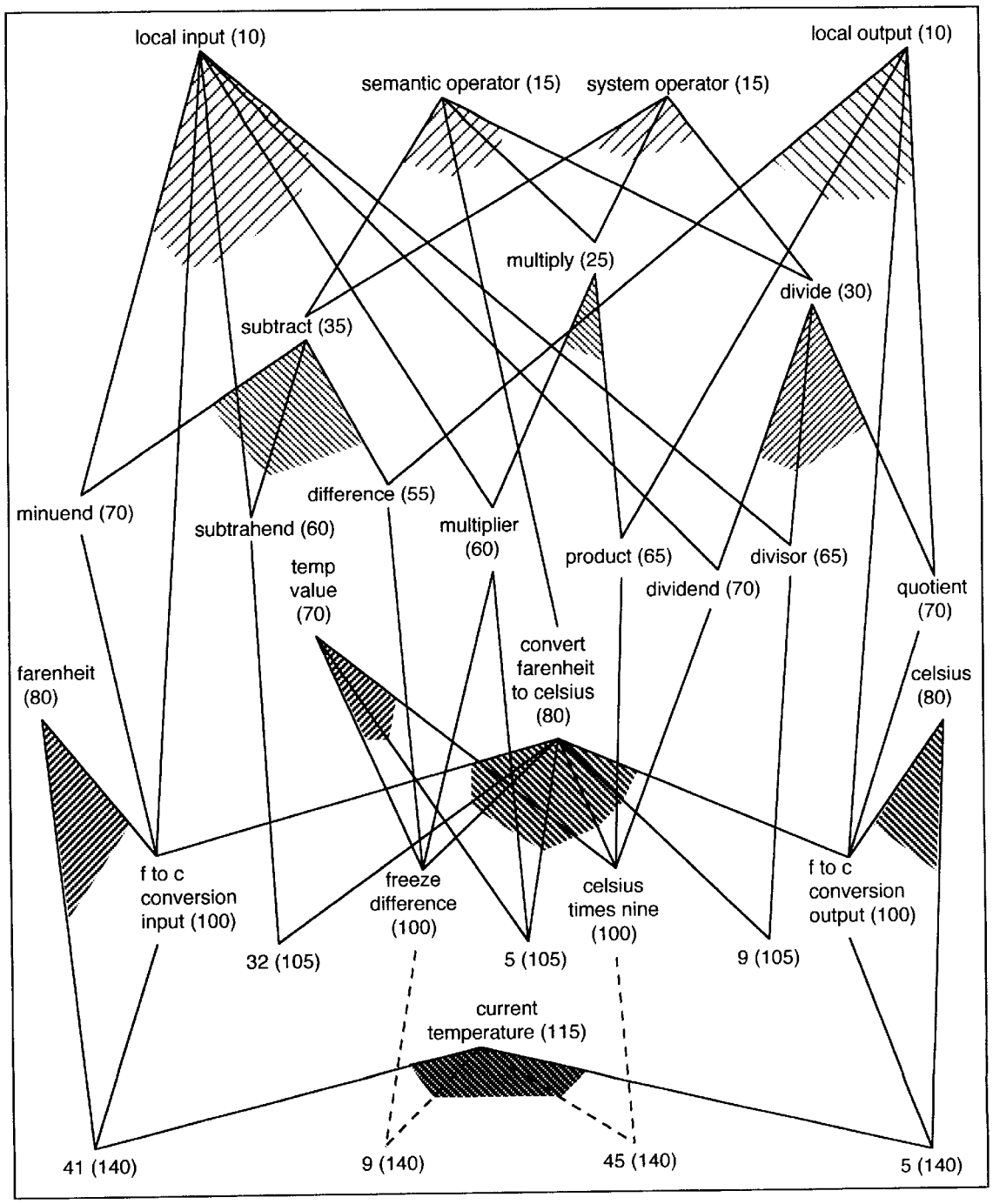
FIG. 15 is a semantic network composed of abstraction hierarchies of arithmetic operators arranged to convert temperatures from Fahrenheit degrees to Celsius degrees.

Any computer algorithm can be defined by a semantic network. For instance, the calculation which converts temperature in Fahrenheit degrees to temperature in Celsius degrees can be defined in a semantic network of dictionary entries where each entry is assigned a universal abstraction number. In FIG. 15, such a definition is shown, where the generally useful concepts of 'subtract (35)', 'multiply (25)' and 'divide (30)' are near the top, directly under the even more generally useful concepts of 'local input (10)', 'semantic operator (15)', 'system operator (15)' and 'local output (10)'.

To improve the readability of FIG. 15, the convergence of lines under important concepts are shaded, with the lighter shading denoting more abstract concepts, and darker shading denoting more concrete concepts. This technique of shading is also part of the present invention, generally useful in graphical displays of abstraction hierarchies, since it is analogous to the way the human eye sees sharper images in the foreground, with hazier images in the distant background.

The general concepts of input, output and operators are necessary to form procedural definitions. In FIG. 15 they are shown as peak abstractions which orchestrate the execution of dataflow driven calculations. The concept of 'convert fahrenheit to celsius (80)' inherits from the less concrete 'subtract (35)', 'multiply (25)' and 'divide (30)'. Still more concrete is the concept of 'current temperature (115)' which describes an instance of a particular temperature.

The link from '41 (140)' to 'fahrenheit (80)' signifies that '41 (140)' is a Fahrenheit number. The link from '41 (140)' to 'current temperature (115)' signifies that it is a current temperature as well. The link from '41 (140)' to 'f to c conversion input (100)' in conjunction with the link from 'f to c conversion input (100)' to 'local input (10)' enables the system to recognize that data linked to 'f to c conversion input (100)' should flow to the nearest operator, which in this case is 'convert fahrenheit to celsius (80)', which is defined as an operator by its link to 'system operator (15)'.

The entry 'f to c conversion input (100)' in turn has a link to the more general 'minuend (70)', which also has links to 'local input (10)' and the nearest operator 'subtract (35)'. Therefore data flows abstractward again to the operator 'subtract (35)' defined as an operator by its link to 'system operator (15)'.

The dataflows as guided by the 'local input' and 'local output' abstractions proceed from operator to operator in a manner analogous to a calling stack of functional calls. When all of a system operator's nodes tagged with 'local input' links receive dataflows, nodes defined as operators can execute, producing a 'local output' which is stored under the originating caller concept. Thus the 'local output' of 'subtract (35)' is passed back down to 'freeze difference (100)' and passed further down to the originating caller 'current temperature (115)' where it is stored in a inheritor node '9 (140)'.

This method of passing information from operator to operator is common to most dataflow languages. Since this dataflow is being defined by an abstraction hierarchy, there is additional order to it; the stack of operators is ordered by concreteness number, so that inputs are passed abstractward and outputs are passed concreteward. This additional order prevents a common problem encountered when reading hand-coded procedures, where the concreteness of a particular function call cannot be determined, and so the reader often has to read and memorize many function definitions, mentally reassigning their relative concreteness to build a map of the calling structure.

The definition of 'convert fahrenheit to celsius (80)' orchestrates the application of 'subtract', 'multiply', and 'divide' operators to produce the following dataflows:

Nodes '41 (140)' and '32 (105)' flow as local inputs to 'subtract', which creates the local output '9 (140)' under 'freeze difference (100)'. Then entries '9 (140)' and '5 (105)' flow as local inputs to 'multiply (25)', which creates the local output '45 (140)' under 'celsius times nine (100)'. Then entries '45 (140)' and 9 (105) flow as local inputs to 'divide (30)', which creates the local output '5 (140)' under 'f to c conversion output (100)'.

Most programming languages have constructs such as local variables within functions where temporary values can be stored. These constructs are important since they allow detail of calculations to be encapsulated within functions. The present invention also provides encapsulations, by way of an abstract concept hereinafter referred to as 'temp value'.

In FIG. 15, an example of the use of the temp value concept is shown. Since 'freeze difference (100)' and 'celsius times nine (100)' inherit from temp value (70), their inheritor entries '9 (140)' and '45 (140)' are removed after the execution of operator 'convert fahrenheit to celsius (80)' is complete, to cleaning up the state of the 'current temperature (115)' hierarchy. After execution is complete, temporary entries (linked by the dashed lines) should vanish, since only the 'f to c conversion input (100)' entry '41 (140)' and the 'f to c conversion output (100)' entry '5 (140)' have persistent meaning. This ability to automatically do away with temporary values is similar to the ability of local variables in function definitions to vanish after function execution in many computer languages.

The concept of 'system operator (15)' is differentiated from 'semantic operator (15)' because system operators invoke computations defined by the semantic network system environment itself, whereas non-system operators such as semantic operators are defined purely by the semantic network links. This differentiation occurs because at some point a boundary is crossed when it is more convenient or efficient to call an operator defined by the computing environment, such as addition and subtraction, which are called from semantic operators which need to perform addition and subtraction for a specific purpose.

Figure 16:
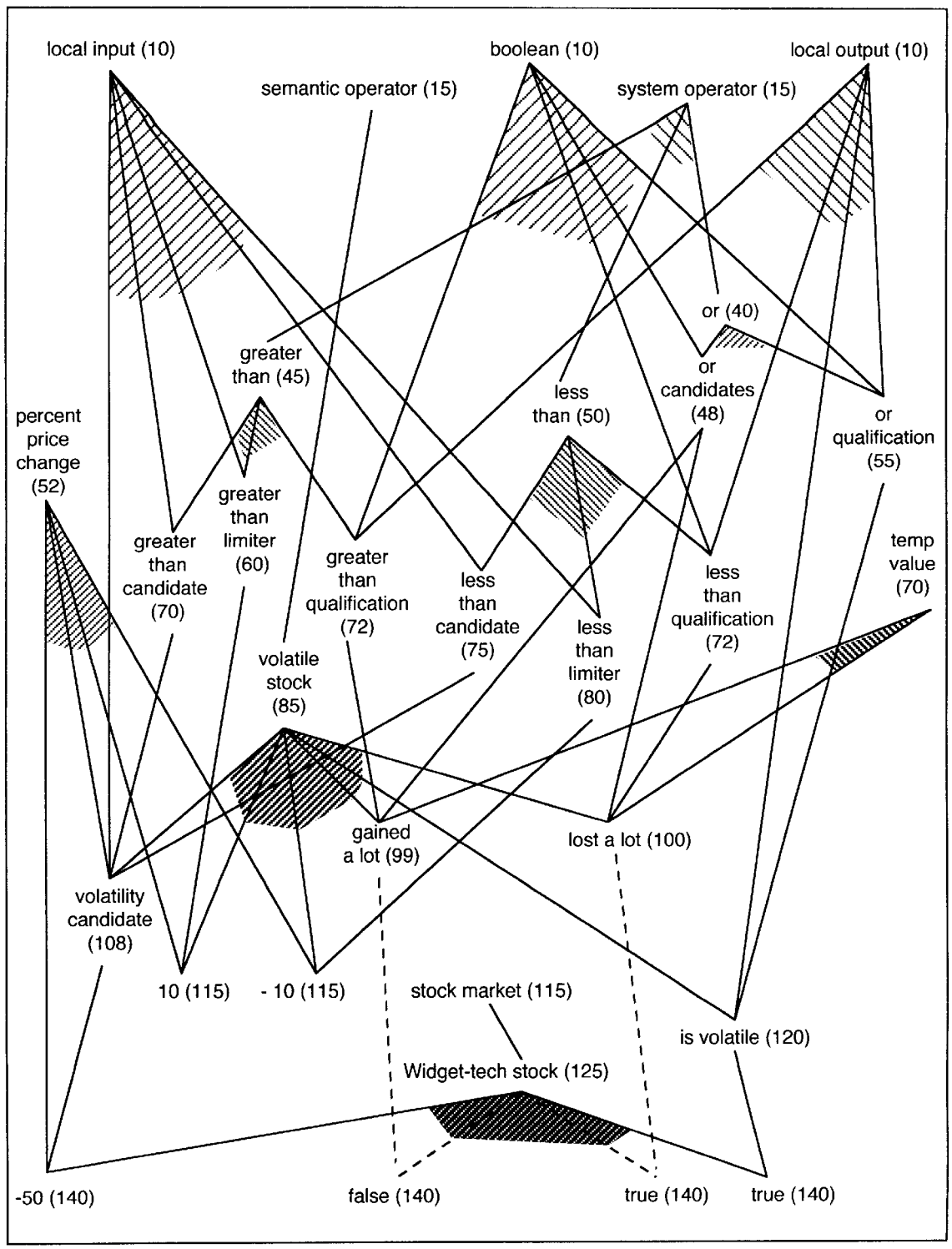
FIG. 16 is a semantic network composed of abstraction hierarchies of logical operators arranged to determine whether a given percentage change of price signifies pricing volatility.

Other operators using the abstract concepts of 'local input', 'local output', 'semantic operator', 'system operator' and 'temp value' can be implemented, to complete the ability of the semantic network to define procedures and functional hierarchies. In FIG. 16 there is an example of a functional hierarchy of logical operators, defined by a semantic network of abstraction hierarchies.

The peak abstractions of the hierarchies in FIG. 16 are the same as the peak abstractions of FIG. 15, with the addition of a new peak abstraction 'boolean (10)', which defines concepts which must have true or false value at the instance level. Under these peak abstractions are boolean operators whose output is a single boolean value: 'greater than (45)', 'less than (50)' and 'or (40)'. Below this level, at a greater concreteness, there is a single semantic dataflow operator 'volatile stock (85)' which produces as output the inheritors of 'is volatile (120)' a boolean classification of whether a stock is volatile. Since 'volatile stock (85)' is a dataflow operator, it only executes when changes occur to its inputs which are the inheritors of 'percent price change (52)'.

At the greatest level of concreteness in FIG. 16 is a instance of a specific stock 'Widget-tech stock (125)' which hold the temp values 'false (140)' under 'gained a lot (99)' and 'true (140)' under 'lost a lot (100)'. These temp values and their indicated dashed line links will vanish after the semantic operator 'volatile stock (85)' completes execution, just as the temp values in FIG. 15 vanish after the operator 'convert fahrenheit to celsius (80)' completes execution.

Figure 17:
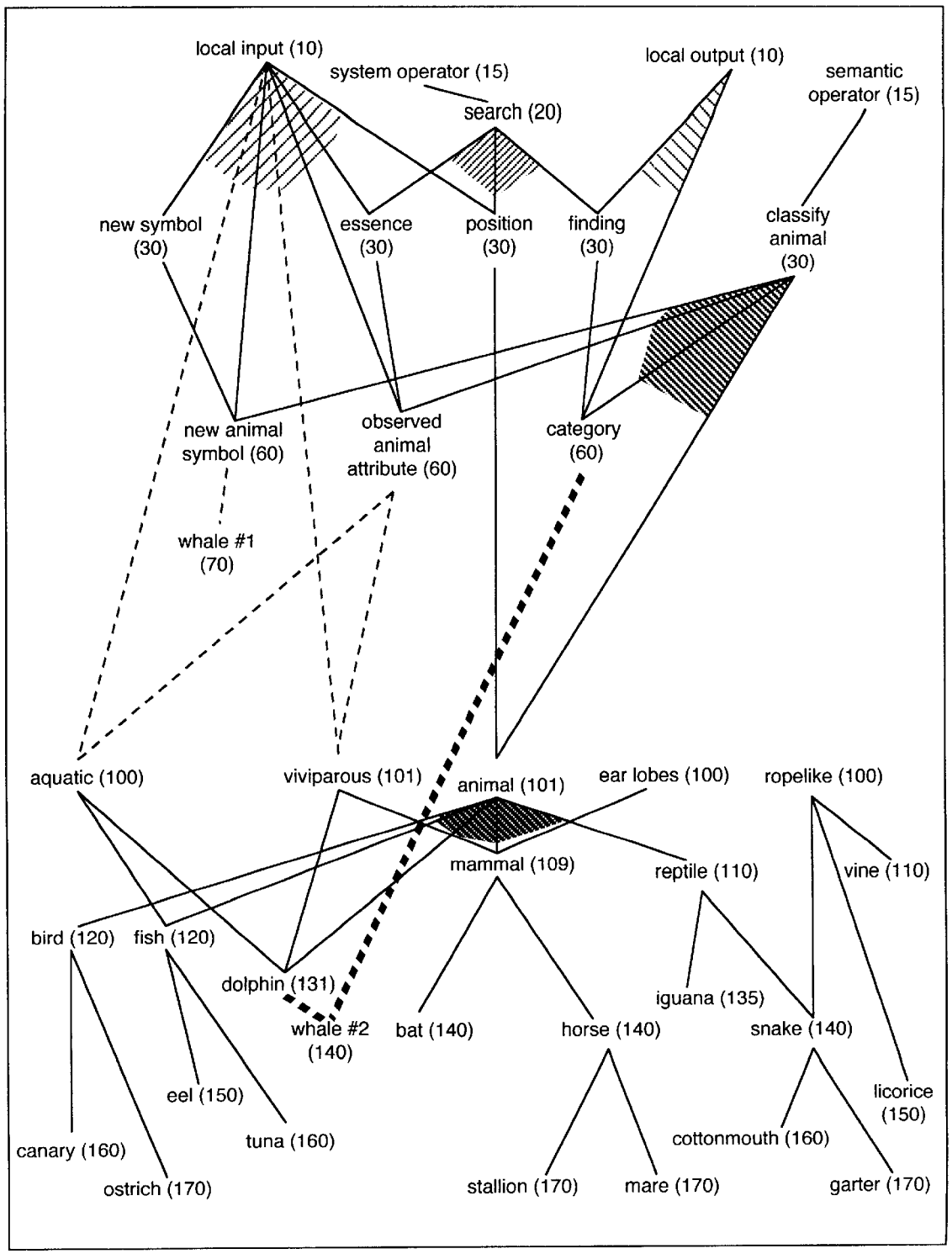
FIG. 17 is a semantic network composed of abstraction hierarchies from FIG. 2 together with classification operators for adding new entries to the animal abstraction hierarchy.

Operators can be included in the semantic hierarchy which create and retract links to the abstraction hierarchies themselves. In FIG. 17, a system operator 'search (20)' provides this facility. It matches an input 'essence (30)' within a hierarchy pointed to by input 'position (30)' for an appropriate location for an input 'new symbol (30)'. At a greater level of concreteness, a semantic operator 'classify animal (30)' is defined, matching an input 'observed animal attribute (60)' for an input 'new animal symbol (60)' to place the new animal symbol as output 'category (60)'.

The instance of a new symbol 'whale #1 (70)' is presented as input to 'new animal symbol (60)'. At even greater concreteness, the symbols 'aquatic (100)' and 'viviparous (101' from FIG. 1 are shown in FIG. 17, as inputs to 'observed animal attribute (60)'. Having linked to all inputs of the dataflow operator 'classify animal (30)', that operator matches viviparous and aquatic against the animal hierarchy to produces output (linked by bold dashed lines) of a new entry 'whale #2 (140)' under 'dolphin (131)'. The '#' followed by a number indicates that the entry is differentiated by a unique number from other 'whale' entries such as 'whale #1 (70)'.

Another advantage of the present invention has to do with the inherent ability of empirically maintained abstraction hierarchies to detect and remove spurious or obsolete actions from functional trees. Often as procedural definitions evolve, the meaning of action concepts migrates from abstract to concrete, thus making the early links associated with those action concepts inappropriately concrete.

Figure 18:
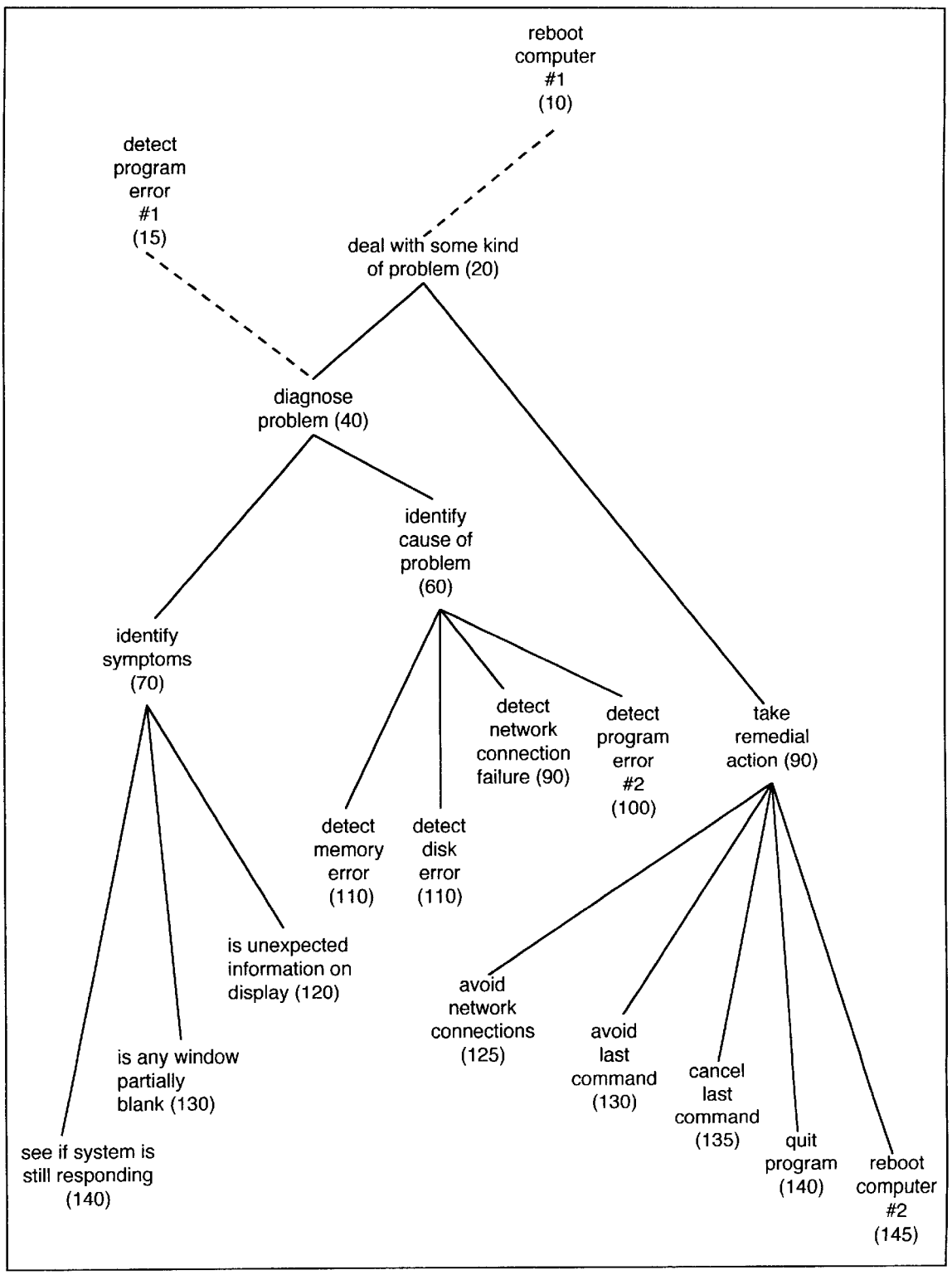
FIG. 18 is a semantic network composed of a computer help-desk application abstraction hierarchy, showing concepts for recommended actions, in order to demonstrate relationships between degrees of abstraction and appropriateness of links between actions.

In FIG. 18 an example of such a migration is shown. The application is an evolving computer help-desk application, where the inputs are descriptions of problems and the outputs are action remedies for those problems. To simplify the example, details such as specific inputs, outputs, parsing and matching operators have been omitted from FIG. 18, to concentrate solely on showing a sample of symptoms and related action remedies.

Initially, when the application is created, through lack of experience it may have very few ways of dealing with problems. In fact, it may be so simple that all ways of dealing with problems inherit the action remedy 'reboot computer #1 (10)'.

As the help-desk application evolves, it may acquire more links to 'reboot computer', such as links to the kinds of things which are lost when rebooting is performed, situations when rebooting is not desirable, and different ways of rebooting. Consequently, the entry for 'reboot computer' would become more concrete, shown as 'reboot computer #2 (145)'. In this more concrete position, it would be inappropriate for an abstract action such as 'deal with some kind of problem (20)' to inherit from it, because to do so would engender a kind of reactionary behavior, not taking into account the many facts that an abstract action should consider, such as 'diagnose problem (40)', 'identify symptoms (70)' and 'identify cause of problem (60)'.

Similarly, when the application is created, through lack of experience it may have very few ways of identifying causes of problems. It may be so simple that all ways of identifying causes of problems inherit the action remedy 'detect program error #1 (15)'.

As the help-desk application evolves, it may acquire more links to 'detect program error' such as different kinds of errors in different programs. Consequently, the entry for 'detect program error' would become more concrete, shown as 'detect program error #2 (100)'. In this more concrete position, it would be inappropriate for 'diagnose problem (40)' to inherit from it. However, the degree of mistake is less then the mistake of inheriting 'reboot computer' from 'deal with some kind of problem', and this is quantifiable, since the constraint of inheritors having greater concreteness than their inherited nodes is not violated by such a wide margin.

I claim:

1. A computer implemented method for natural language processing, parsing meanings from conversational input symbol sequences of using a semantic inheritance network which stores semantic inheritance links describing dictionary entry senses of meaning, each dictionary entry assigned a numeric concreteness, the various senses of meaning comprising a range of concreteness, each dictionary entry inheriting only from dictionary entries having lesser concreteness of meaning, where the method of parsing meanings from sequences of symbols comprises the following steps:

a) parsing said input symbol sequences,
   b) matching the symbols of said sequence to identical symbols in said dictionary entries, to identify the possible meanings for each symbol which matches,
   c) from said possible meanings, choosing a subset of meanings having a range of concreteness similar to said semantic inheritance network,
   d) identifying ranges of concreteness in said semantic network which are missing from the range of concreteness covered by said subset of meanings,
   e) producing conversational output in the form of messages describing senses of meaning from said dictionary in the missing range or ranges of concreteness.

2. Apparatus for processing natural language input symbol sequences, comprising
   means for storing dictionary entry senses of meaning within a semantic inheritance network;
   means for assigning to each dictionary entry a number describing concreteness of meaning;
   means for parsing natural language symbol sequences, matching symbols to said dictionary entries to identify possible meanings for each input symbol;
   means for identifying dictionary numeric ranges of concreteness covered by said dictionary entry senses of meaning;
   means for identifying input numeric ranges of concreteness covered by said input symbol sequences;
   means for identifying missing dictionary numeric ranges of concreteness not covered by said input numeric ranges of concreteness;
   means for producing output describing missing dictionary numeric ranges of concreteness.

3. Apparatus as defined in claim 2 further comprising means for increasing said assigned concreteness of meaning of an entry when adding a symbolic inheritor link from that entry to an inherited entry.

4. Apparatus as defined in claim 2 further comprising means for decreasing said assigned concreteness of meaning of an entry when removing a symbolic inheritor link from that entry to an inherited entry.

5. Apparatus as defined in claim 2, further comprising means for assigning concreteness of meaning to a first entry when creating a new inheritor link, designated as a tethering link, from said first entry to a second entry representing inheritance of meaning from said second entry, wherein a concreteness of meaning is assigned to said first entry which is a predefined number greater than the concreteness of said second entry.

6. Apparatus as defined in claim 5, further comprising means for propagating changes in concreteness from inherited entries to corresponding inheritor entries directly connected to said inherited entries by tether links, wherein adjustments to the concreteness of inheritor entries are the same or proportional to the amount of change in concreteness of inherited entries.

7. Apparatus as defined in claim 2, further comprising
   means for normalizing the concreteness of non-normal entries inherited by inheritor entries of lesser concreteness;
   means for identifying non-normal inheritor entries whose concreteness is greater than their corresponding inheritor entries;
   means for creating intermediary entries between said non-normal inherited entries and corresponding inheritor entries, by replacing the direct links between non-normal inheritor entries and corresponding inheritor entries by indirect links through the intermediary entries, thereby reducing the population of said direct links so that the concreteness of said non-normal inheritor entries is reduced to less than concreteness of said inheritor entries.

8. Apparatus as defined in claim 2, further comprising procedural input and output values passed solely along inheritance hierarchies.

9. Apparatus as defined in claim 8, further comprising procedural operators of logic, arithmetic, parsing, concatenation and dataflow meanings defined within said semantic network to support actions described in claim 2.

* * * * *